J. M. COLEMAN.
CAR CONSTRUCTION.
APPLICATION FILED AUG. 22, 1912.

1,111,949. Patented Sept. 29, 1914.

Witnesses

Inventor
James M. Coleman.
By Fred B. Fetherstonhaugh
His Attorney.

UNITED STATES PATENT OFFICE.

JAMES M. COLEMAN, OF MONTREAL, QUEBEC, CANADA.

CAR CONSTRUCTION.

1,111,949.          Specification of Letters Patent.        Patented Sept. 29, 1914.

Application filed August 22, 1912. Serial No. 716,521.

*To all whom it may concern:*

Be it known that I, JAMES M. COLEMAN, of the city of Montreal, in the Province of Quebec and Dominion of Canada, have invented certain new and useful Improvements in Car Construction, of which the following is a full, clear, and exact description.

This invention relates to improvements in means for connecting car trucks to car bodies without impairing the flexibility of the body in its relation to the trucks.

The object of the invention is to provide a connection so designed and arranged that the trucks of a car will not leave the body in case of an accident and will thus prevent telescoping of the cars.

It has been found that in collisions and the like the strong underframe of the cars is practically uninjured while the light upper frame is completely destroyed, owing to the underframe of one car sliding over the underframe of another car and thus demolishing the upper frames of both cars. This action is known as telescoping, and it has been demonstrated that if the trucks remain attached to the underframes they will engage the ends of adjacent underframes and hold the underframes from sliding over one another. Furthermore if the trucks remain attached to the underframes the additional weight will greatly minimize the up-ending of the cars in a collision and in addition to this will in many instances hold the cars on the track when detached car bodies would overbalance and roll down embankments.

The requirements of a connection which will hold car bodies and trucks together under the above mentioned conditions are, first, sufficient size to have strength to resist the shearing stress incident to a collision impact; and second, easy detachability for repairs without the possibility of accidental detachment. In addition to this the flexibility between the body and truck must not be interfered with.

To meet the above set forth conditions and provide a connection which will effectively hold the truck to the car under all circumstances I employ a king or pivot pin of greatly increased size which passes through the body and truck bolsters in the usual manner. The lower end of this king pin is provided with gravity actuated pawls which drop outwardly through slots in the truck bolster when the car body is lowered into position and form a very strong cotter which holds the king pin against removal from the truck bolster.

Figure 1:
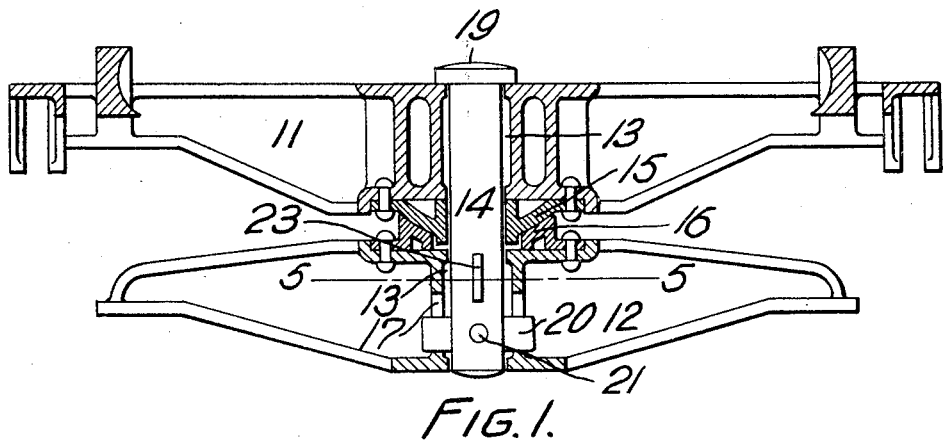
Figure 2:
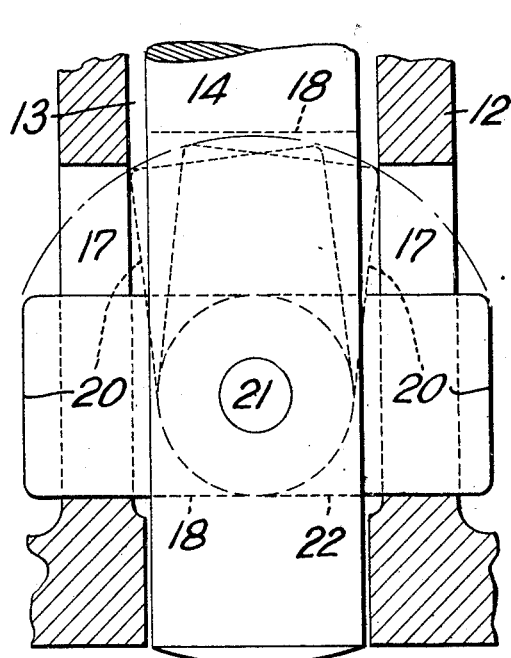
Figure 3:
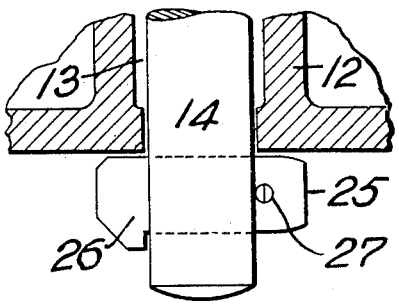
Figure 4:
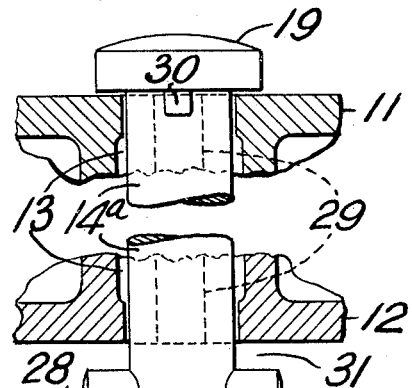
Figure 5:
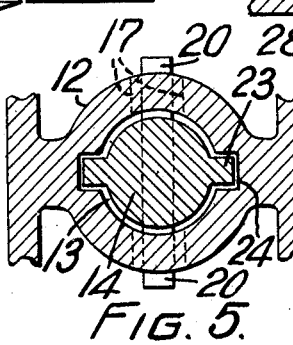

In the drawings which illustrate the invention:—Figure 1 is a front elevation, partly in section, of the body and truck bolsters showing the same connected according to this invention. Fig. 2 is an enlarged sectional view of a fragment of the truck bolster showing the arrangement of the pawls. Fig. 3 is a view similar to Fig. 2 showing a simplified form of the invention. Fig. 4 is a further view similar to Fig. 2, showing an alternative form of the device. Fig. 5 is a horizontal sectional view on the line 5—5 of Fig. 1.

Referring more particularly to the drawings, 11 designates the body bolster and 12 the truck bolster, each of which is provided with a central circular aperture 13 for the passage of the king pin 14. The lower side of the body bolster is provided with a convexly surfaced bearing member 15 which seats and automatically centers itself in the concavely surfaced member 16 carried on the upper side of the truck bolster. These two members 15 and 16 are the bearings upon which the entire weight of the car body is supported and transmitted to the trucks. The walls surrounding the pin opening 13 of the truck bolster are provided with a pair of vertically disposed slots 17 which face the ends of the bolster.

The king pin 14 is provided near its lower end with a vertical slot 18 positioned so that its bottom is on a level with the bottoms of the bolster slots 17 when the head 19 of the pin rests on the top of the body bolster. A pair of pawls 20 of much greater depth than thickness are formed preferably with their upper and lower edges parallel and each with one end semicircular. These pawls are pivotally mounted in the slot 18 upon a pin 21 which passes concentrically through the semicircular ends of the pawls. The pin 21 is located close to the bottom of the slot so that when the pawls are in horizontal position, as shown in Figs. 1 and 2, the lower edges of the pawls will rest on the bottom 22 of the slot and be thereby supported in horizontal position. In order to hold the king pin in such position that the pawls will fall out into the slots 17 the pin may be provided with a pair of ribs or pins 23 which engage slots 24 formed in the truck bolster.

A slightly simplified form of the invention is shown in Fig. 3 in which the pawls 20 are replaced by a single cotter pin 25 which passes through the end of the king pin below the truck bolster, the king pin being suitably lengthened. The cotter pin 25, which is sometimes called a gib, is provided on one end with a head 26 and near the other end with an aperture for the reception of a small split pin 27.

In Fig. 4 an alternative form is shown which consists of a pair of lugs or pins 28 formed integral with the king pin 14ª. These lugs are passed through slots in the body and truck bolsters when the king pin is inserted, and the pin is then turned to prevent upward movement of the lugs in the slots. To prevent the pin turning so as to bring the lugs again in line with the slots, some sort of key or fastening should be used. This fastening preferably consists of a small lug or fin 30 formed under the head 19ª one-quarter of the way around the pin from the lugs 28. There is a certain slackness indicated at 31 between the top of the lugs 28 and the bottom of the truck bolster, which is approximately equal to the depth of the fin 30, so that when the pin is dropped until the fin rests on the body bolster the pin may be turned to bring the lugs out of line with the slots. When the pin is turned through 90° the fin drops into one of the lug slots and holds the pin against further turning. The cover plate in the car floor will hold the pin against climbing sufficiently to allow it to turn. Unless the pin is properly turned to locking position as previously described, the cover plate cannot be placed in the car floor.

The operation of the device is very simple. The pawls normally occupy the position shown in full lines, Fig. 2. When a car body is lowered onto its trucks the king pin enters the aperture 13 in the truck bloster and the pawls are forced upwardly into the slot 18, as shown in dotted lines. When the two bolsters engage the pin has moved down until the outer ends of the pawls are opposite the slots 17 into which they fall. Any attempt to lift the car from its trucks is resisted by the pawls which engage the tops of the slots and are held from moving lower than the horizontal position by their abutment on the bottom of the pin slot. The pawls and pin 21 supporting them need only be strong enough to sustain the weight of the truck while the king pin must be strong enough to withstand the shearing stress between the truck and car underframe due to the impact of collision. To remove the car body from the truck, pawls are raised into the slot 18 and the king pin lifted out. When inserting the king pin the ribs 23 engage the grooves 24 and aline the pin so that the pawls 20 are in line with the bolster slots 17. If the alinement is not perfect the ribs 23 will strike on the truck bolster and stop the downward movement of the pin so that same must be turned into proper alinement.

Having thus described my invention, what I claim is:—

1. A device of the character described comprising the combination with a body bolster and a truck bolster of a king pin pivotally connecting the bolsters, means carried by the pin automatically engaging the truck bolster to hold the pin against removal and means for alining the pin arranged to bring said automatically engaging mechanism into operative relation with the truck bolster.

2. A device of the character described comprising the combination with a body bolster and a truck bolster having vertically disposed slots and grooves formed therein of a king pin pivotally connecting said bolsters, pawls pivotally mounted on said pin arranged to automatically engage through the slots of the truck bolster and ribs on said pin coöperating with the bolster grooves to hold the pin in such position that the pawls aline with the bolster slots.

In witness wheref I have hereunto set my hand in the presence of two witnesses.

JAMES M. COLEMAN.

Witnesses:
STUART R. W. ALLEN,
G. M. MORELAND.

---

Copies of this patent may be obtained for five cents each, by addressing the "Commissioner of Patents, Washington, D. C."